United States Patent [19]

Hausdorf et al.

[11] Patent Number: 4,799,967

[45] Date of Patent: Jan. 24, 1989

[54] METHOD FOR CLEANING APPARATUS FOR FABRICATING REACTIVE MULTIPLE-COMPONENT MIXTURES CONTAINING ISOCYANATE

[75] Inventors: Jörg Hausdorf, Mörlenbach; Joachim Kändler, Weinheim; Volker Siekermann, Fürth, all of Fed. Rep. of Germany

[73] Assignee: Firma Carl Freudenberg, Weinheim/Bergstr., Fed. Rep. of Germany

[21] Appl. No.: 133,310

[22] Filed: Dec. 16, 1987

[30] Foreign Application Priority Data

Apr. 24, 1987 [DE] Fed. Rep. of Germany ....... 3713702

[51] Int. Cl.[4] ........................ B08B 7/00; C23D 17/00; C09D 9/00; C11D 7/50

[52] U.S. Cl. ........................................ 134/38; 134/42; 252/170; 252/559; 252/DIG. 8

[58] Field of Search ................. 252/170, 559, DIG. 8; 134/38, 42

[56] References Cited

U.S. PATENT DOCUMENTS

| | | | |
|---|---|---|---|
| 1,974,744 | 9/1934 | Klinkenstein | 252/DIG. 8 |
| 2,315,125 | 3/1943 | Meckler | 106/287 |
| 4,056,403 | 11/1977 | Cramer et al. | 134/22 R |
| 4,483,783 | 11/1984 | Albanese | 252/312 |
| 4,741,784 | 5/1988 | Roeser, Jr. | 252/90 |

FOREIGN PATENT DOCUMENTS

| | | |
|---|---|---|
| 0154446 | 3/1982 | German Democratic Rep. . |
| 51-041004 | 4/1976 | Japan . |
| 2172304 | 9/1986 | United Kingdom . |

*Primary Examiner*—Paul Lieberman
*Assistant Examiner*—Ronald A. Kwasnow
*Attorney, Agent, or Firm*—Felfe & Lynch

[57] ABSTRACT

Disclosed is a cleaning agent and method for the cleaning of apparatus used for the fabrication of reactive, multiple-component mixtures containing isocyanate. The cleaning agent consists of 50 to 75 weight-percent of a plasticizer from the group of short to medium chain length phthalic acid esters or alkylsulfonic acid esters of phenols, and 50 to 25 weight-percent of a mineral oil fraction of an aliphatic, naphthenic and/or aromatic hydrocarbon, or mixtures thereof, in the range of from 8 to 17 carbon atoms.

8 Claims, No Drawings

METHOD FOR CLEANING APPARATUS FOR FABRICATING REACTIVE MULTIPLE-COMPONENT MIXTURES CONTAINING ISOCYANATE

BACKGROUND OF THE INVENTION

The present invention is in a method for using cleaning agent and more specifically relates to a method agent for cleaning apparatus used for the fabrication of reactive multiple-component mixtures containing isocyanate.

In the manufacture of fast-curing plastics or plastic foams based on polyurethane and polyisocyanurate, fabricating apparatus are used in which the reactive mixtures containing isocyanate, which are needed for the production of the end product, are fed to the molds through mixing heads. The mixing heads, which may be equipped with stirring mechanisms, tend to clog and must therefore be kept open by periodic flushing, usually after each batch, with suitable flushing agents. The hoppers, valves and pipelines ahead of the mixing heads also must be cleaned periodically with a flushing agent.

Heretofore solvents or solvent mixtures, in which the substances to be removed are soluble, have been used for cleaning. These solvents are normally chlorinated hydrocarbons such as dichloromethane, trichloroethylene, 1,1,1-trichloroethane, tetrachloroethylene, or carboxyl-group containing, highly volatile solvents such as acetone, methyl-ethyl-ketone, ethyl acetate, pentyl acetate, or mixtures thereof. Such agents are described in DE-OS 34 44 293.

One serious disadvantage of these solvents is that they are harmful to human health and to the environment, and due to their halogen content are expensive to remove, or are highly volatile and easily inflammable, so that special, complex apparatus are required to prevent explosions. For example, the flash point of ethyl acetate and methylethylketone is −4° C., that of acetone less than −20° C., and that of n-butylacetate, 25° C.

The chlorinated hydrocarbons are toxic to the liver and nervous system, some are carcinogenic, and therefore are subject to special use and labeling regulations. Furthermore, these substances are poorly biodegradable in the soil.

DE-OS 35 17 170 discloses a cleaning agent which contains nonaromatic, high-boiling hydrocarbons and alkylated aromatic compounds of 8 to 18 carbon atoms. Such compositions also have sufficiently high flash points. However, such compositions have proven ineffective for use in apparatus for processing reactive multiple-component systems containing isocyanate.

An aqueous emulsion of a polyvalent alcohol with an oil-in-water emulsifier has been proposed in German Federal Patent 26 05 984. A serious disadvantage of this agent is that even if only minimal amounts of it remain in the fabricating apparatus, which can rarely be prevented, it can chemically react with the isocyanate component and form a residue resulting in problems in the apparatus. Furthermore, this agent can be used only for easily dispersible low viscosity contaminants.

It is an object of the present invention to obtain a noncarcinogenic cleaning agent which has good cleaning properties but which is difficultly inflammable especially for the cleaning of apparatus for the fabrication of reactive multiple-component mixtures containing isocyanate. It is a further object that the cleaning agent be safe to use and be readily disposable. The agent must completely dissolve or disperse the reactive components—the so-called "adducts"—as well as the products of the incipient reaction which are not yet highly crosslinked, without the need for using elevated shearing forces.

THE INVENTION

The present invention is in a method for using cleaning agent of the composition of a plasticizer and a solvent. The composition comprises 50 to 75 weight-percent of an ester of (a) phthalic acid and an aliphatic alcohol with a chain length of 2 to 13 carbon atoms per molecule ("carbon number"), or (b) a short to medium chain length alkylsulfonic acid and a phenol; and 25 to 50 weight-percent of a mineral oil fraction with carbon numbers from 8 to 17 of aliphatic, naphthenic or aromatic hydrocarbons, or mixtures thereof. The boiling range of the mineral oil fraction is between 120° C. and 300° C.

A preferred plasticizer is diethyl or dioctyl phthalate. Further, it is preferred that the contained mineral oil fractions have a boiling range above 180° C. at a flash point above 55° C. A further preferred mineral oil fraction is one that contains kerosene and/or mineral spirits. It is also preferred that it contains aromatic-free mineral oil fractions with a boiling range of 230° C. to 260° C. at a flash point above 100° C.

The plasticizer content of the cleaning agent according to the invention has previously been known only in the fabrication of PVC and in paint manufacture. Suitable plasticizers are esters of phthalic acid with short to medium-length chain (2 to 13 carbon atoms) aliphatic alcohols, especially diethyl or dioctyl phthalate, or short to medium-length chain alkylsulfonic acid esters of phenols. The latter are obtainable as ready-to-use commercial products, for example MESAMOLL from the firm BAYER AG, Leverkusen, Fed. Rep. of Germany. The flash points of the plasticizers are above 150° C.; they are therefore also usable without problems.

Suitable mineral oil products are mineral oil fractions having carbon numbers from 8 to 17 of aliphatic, naphthenic or aromatic hydrocarbons or mixtures thereof. The boiling range of these fractions is between 120° C. and 300° C. For safe operation, it is advantageous to use fractions with boiling ranges above 180° C. at flash points above 55° C. Kerosene and/or mineral spirits have proven useful.

Aromatic-free mineral oil fractions whose boiling range is between 230° and 260° C. with a flash point above 100° C. are highly advantageous especially as to toxicological considerations.

The ratio of admixture of these fractions is not critical, i.e., it has no qualitative influence on the action of the cleaning agent according to the invention. Such mixtures of hydrocarbon fractions are also obtainable commercially under various names.

The elimination of spent residues of the cleaning agent can be performed easily and safely. Components present in equivalent amounts react spontaneously, as a rule, to form harmless products. Residues of still-reactive isocyanate components, e.g., those remaining after the cleaning of pipelines and tanks, can easily be converted to harmless, completely reacted products, if desired, by the appropriate addition water, ammonia and/or alcohol, a chemical reaction being obvious. If spent cleaning mixtures enter into the plant waste water, they can be separated from it by means of a light-liquid separator, which as a rule is available.

The formulation of the solvent according to the invention was unexpected inasmuch as neither individual component has the required cleaning action. The ratio of admixture of the components can be optimized within the limits according to the invention by simple preliminary experiments with the residues to be removed in each case. Typical constituents of these residues are, e.g., 4,4-diphenylmethanediisocyanate, also in modified form, toluylene diisocyanate, the linear and branched polyethers and polyesters commonly used in polyurethane chemistry, and adducts of, for example, naphthylene-1,5-diisocyanate with a linear polyester of alipic acid and ethylene glycol.

The flushing agent according to the invention is used in a known manner by running it through the apparatus instead of the reaction components with the aid of pumps if necessary. The apparatus then can be dried rapidly with an air stream of 6 bar gauge pressure or the cleaning agent can be blown out.

The composition, application and advantages of the cleaning agent according to the invention will be further explained by the following Examples:

EXAMPLE 1

A mixture of 66 weight-percent of alkylsulfonic acid esters of phenols, available under the trademark MESAMOLL from BAYER, AG, Leverkusen, Fed. Republic of Germany and 34 weight-percent of Kerosene (boiling range 180° to 145° C.) is used for cleaning a casting machine with a mixing chamber and stirrer, in which polyurethane foam parts are made from a branched polyether based on polyethylene and polypropylene glycol, modified diphenyl methane diisocyanate, and the common additives. After the mixing and ejection, about 20 ml of reactive mixture is left in the mixing chamber.

The mixing chamber is flushed out with 60 ml of the above-named cleaning agent mixture from the supply tank for 6 seconds at room temperature. Then it is dried for 3 seconds with flowing air (6 bar gauge air pressure, room temperature). The mixing unit is then ready for the next mixing action. Neither flushing agent nor reaction components remain in the apparatus.

EXAMPLE 2

A mixture of 70 weight-percent of dioctylphthalate and 30 weight-percent of a nonaromatic hydrocarbon fraction, trademark *) TM *) SHELLSOL D 70 from the Shell AG, Fed. Rep. of Germany (boiling range 240°to 260° C., a commercial product), is prepared. An apparatus in which polyurethane elastomer parts are made from an adduct of naphthylene-1,5-diisocyanate and a linear polyester from adipic acid and ethylene glycol at 90° C., is flushed out with 100 ml of cleaning mixture at 90° C. for 3 seconds, and blown out for 2 seconds with compressed air of room temperature and of 6bar gauge pressure. The apparatus runs without cleaning for the period of one shift, which had been the case previously only if dichloromethane was used.

EXAMPLE 3

The contaminated cleaning agent residues of Examples 1 and 2 can be allowed to react out, thereby converting the isocyanate components to harmless products. For cleaning more rapidly water, ammonia and/or an alcohol can be added as broadly known in the art.

The solids that are formed are separated from the liquid phase by allowing them to settle out. They can be used again for the preparation of a cleaning agent according to the invention.

It will be understood that the specification and examples are illustrative but not limitative of the present invention and that other embodiments within the spirit and scope of the invention will suggest themselves to those skilled in the art.

We claim:

1. A method of cleaning apparatus used in the manufacture of reactive multiple-component mixtures containing isocyanate comprising:

(a) flushing the apparatus with a cleaning agent comprising:

(i) 50 to 75 wt.-% of an ester of a short to medium chain length alkylsulfonic acid and a phenol or selected from the group consisting of diethyl phthalate or dioctyl phthalate, and (ii) 25 to 50 wt.-% of a mineral oil fraction with a carbon number of 8 to 17 of an aliphatic, naphthenic or aromatic hydrocarbon, or mixtures thereof, the boiling range of the fraction being between 120° C. and 300° C.; and (b) drying the apparatus by blowing air therethrough.

2. The method of claim 1 wherein the mineral oil fraction has a boiling range above 180° C. at a flash point above 55° C.

3. The method of claim 1 wherein the mineral oil fraction contains kerosene and/or mineral spirits.

4. The method of claim 2 wherein the cleaning agent contains aromatic-free mineral oil fractions with a boiling range of 230° C. to 260° C. at a flash point above 100° C.

5. A method of cleaning polyurethane foam equipment comprising:

(a) flushing the equipment with a cleaning agent comprising:

(i) 50 to 75 wt.-% of an ester of a short to medium chain length alkylsulfonic acid and a phenol or an ester selected from the group consisting of diethyl phthalate or dioctyl phthalate, and (ii) 25 to 50 wt.-% of a mineral oil fraction with a carbon number of 8 to 17 of an aliphatic, naphthenic or aromatic hydrocarbon, or mixtures thereof, the boiling range of the fraction being between 180° C. and 300° C. at a flash point above 55° C.; and (b) drying the apparatus by blowing air therethrough.

6. The method of claim 5 wherein the mineral oil fraction contains kerosene and/or mineral spirits.

7. The method of claim 5 wherein the cleaning aspect contains aromatic free mineral oil fractions having a boiling range of 230° C. to 260° C. at a flash point above 100° C.

8. The method of claim 5 wherein the flushing is for a period of approximately 3 seconds.

* * * * *